United States Patent [19]
Larner

[11] Patent Number: 4,864,871
[45] Date of Patent: Sep. 12, 1989

[54] TRANSDUCER FOR FLUID FLOW

[75] Inventor: Donald A. Larner, Surrey, Great Britain

[73] Assignee: Fluid Devices Ltd., Great Britain

[21] Appl. No.: 201,059

[22] Filed: Jun. 1, 1988

[30] Foreign Application Priority Data

Jun. 2, 1987 [GB] United Kingdom ............... 8712851

[51] Int. Cl.⁴ .............................................. G01F 1/22
[52] U.S. Cl. ............................... 73/861.58; 73/861.53
[58] Field of Search ............ 73/861.53, 861.54, 861.55, 73/861.58, 861.52

[56] References Cited

U.S. PATENT DOCUMENTS

| | | | |
|---|---|---|---|
| 2,367,544 | 1/1945 | Udale | 73/861.53 |
| 3,600,945 | 5/1971 | Wenzel et al. | 73/861.52 |
| 3,759,098 | 9/1973 | Logsdon et al. | 73/861.52 |
| 3,805,611 | 4/1974 | Hedland | 73/861.58 |
| 4,235,105 | 11/1980 | Walters | 73/861.53 |
| 4,254,664 | 3/1981 | Graham | 73/861.58 |
| 4,552,027 | 11/1985 | Larner | 73/861.53 |

FOREIGN PATENT DOCUMENTS

| | | |
|---|---|---|
| 1773073 | 7/1971 | Fed. Rep. of Germany . |
| 2919192 | 11/1979 | Fed. Rep. of Germany . |
| 2209925 | 7/1974 | France . |

Primary Examiner—Herbert Goldstein
Attorney, Agent, or Firm—Ostrolenk, Faber, Gerb & Soffen

[57] ABSTRACT

A flow transducer with a variable orifice formed between a conical valve member tapering in the downstream direction and a sliding piston located downstream of the valve member. A throat member is fixed within a housing upstream of the valve member. An annular chamber is formed between the walls of the housing and the throat member. Radial holes open from the annular chamber into the bore of the throat member. The radial holes are equally spaced, all of the same diameter, and at the same axial position. An upstream tapping extends into the annular chamber.

7 Claims, 1 Drawing Sheet

TRANSDUCER FOR FLUID FLOW

BACKGROUND OF THE INVENTION

1. Field of the Invention

This invention relates to a flow transducer for producing a pressure differential responsive to rate of fluid flow.

2. Description of the prior art

My United States patent specification No. 4,552,027 discloses a fluid-flow transducer of great utility, capable of use for a wide range of rates of fluid flow. However, the transducer is relatively expensive to make. For certain applications a cheaper transducer, usable over a smaller, though still wide, range of fluid-flow rates, and/or rather less accuracy, would be acceptable.

It is an object of the invention to provide a compact flow transducer of simple and inexpensive construction which will measure with consistent accuracy over a wide flow range.

A further object of the invention is to provide a flow transducer which is particularly suitable for incorporation into a high pressure hydraulic system.

A further object of the invention is to provide a flow transducer which can be serviced in the field by operatives of limited skill and experience without consequent loss of calibration accuracy.

SUMMARY OF THE INVENTION

According to the present invention a flow transducer comprises:-a housing forming a flow passage for the fluid; said passage having disposed therein a parallel throat which enlarges the downstream direction into a chamber; a closely fitting yet freely sliding piston disposed within the chamber and having an axial opening for the flow of fluid; a valve member of substantially conical form located and supported in the chamber for obturating the upstream end of the said axial opening when there is no flow; the said conical valve member extending in the downstream direction nose first into the said axial opening to provide a variable annular orifice for fluid flow, the area of said orifice increasing progressively with increasing axial displacement of the said sliding piston in the downstream direction; and axially extending coil spring for biasing the sliding piston in an upstream direction to tend to reduce the area of the variable annular orifice formed between the piston and the valve member; the housing having two pressure tappings therein at positions respectively upstream and downstream of the variable annular orifice for the detection of a pressure differential induced by fluid flow; the said upstream pressure tapping communicating with an annular chamber surrounding the throat; a plurality of radial holes opening from the annular chamber into the bore of the throat for the detection of the upstream component of the said pressure differential, the said radial holes being all of the same diameter and in the same axial position relative to the throat.

Preferably the housing is made in one piece to minimize cost and to avoid possible leakage and fatigue problems such as are commonly encountered in high pressure hydraulic service.

Preferably connecting means are provided at the upstream and downstream ends of the housing in the form of internal screw threads. If these threads are of standard size having regard to the maximum flow capacity of the transducer and of the system in which it is fitted, making them internal (as opposed to external) screw threads maximizes the possible internal bore size of the housing for the containment of the working parts of the transducer mechanism and allows of the provision of flow passages of optimum size.

Preferably the valve member is of simple frustroconical form which has the effect of producing a roughly linear relationship between rate of fluid flow and pressure differential. If it should be necessary to produce some other relationship between these variables the longitudinal profile of the valve member may be suitably modified; such a modification might be required were a more exactly linear relationship be necessary for instance.

Preferably means are provided for the convenient fine adjustment of the initial loading of the piston biasing spring during manufacturing calibration, together with facilities for subsequent disassembly and reassembly of the transducer mechanism in the field without loss of the original calibration.

Figure 1:
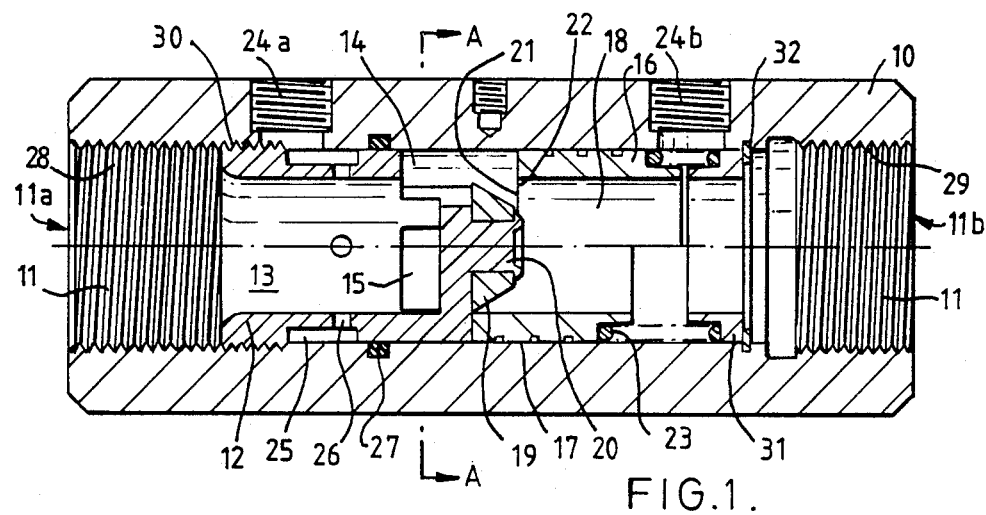
FIG. 1 is a longitudinal section through a flow transducer embodying the invention. The figure shows, above the centerline, the positions of the moving parts at maximum flow and, below the centerline, their positions when little or no flow is taking place.
Figure 2:
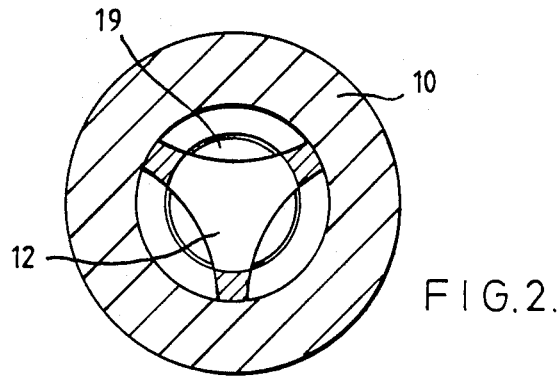
FIG. 2 is a section along the line A—A of FIG. 1.

The invention will be further described by way of example with reference to the accompanying drawings.

DESCRIPTION OF THE PREFERRED EMBODIMENTS

Referring to the drawings, the illustrated flow transducer for producing a pressure differential responsive to rate of fluid flow comprises a one-piece housing 10 forming a flow passage 11 for the fluid (the fluid normally entering at the end 11a and leaving at the end 11b). The passage has inserted therein a throat member 12, the parallel bore 13 of which forms a throat which opens in the downstream direction into a chamber 14 via a number of fixed apertures 15 formed at the downstream end of the throat member 12. A piston 16 is in closely sliding engagement with part 17 of the interior of the chamber 14 and has an axial opening 18 for the flow of fluid. A valve member 19 of substantially conical form is located and supported coaxially with the chamber 14 by an extension 20 of the throat member 12, and extends in the downstream direction (from 11a to 11b) nose first into the axial opening 18. The valve member 19 obturates the axial opening 18 when there is little or no flow taking place. An annular orifice 21 for fluid flow is presented between the conical surface of valve member 19 and the upstream edge 22 of the axial opening 18, the total cross-sectional area of which varies progressively according to the axial position of the piston 16 relative to the valve member. An axially extending coil compression spring 23 is arranged between the piston 16 and a spring seating 31 (see below) for biasing the piston in the upstream direction to tend to close the annular orifice 21. The housing has two pressure tappings 24a, 24b situated respectively upstream and downstream of the annular orifice 21 for detecting a pressure differential induced by fluid flow.

The upstream tapping 24a communicates with the interior 13 of the throat member 12 via an annular chamber 25 of intermediate capacity formed between the throat member 12 and the housing 10 and surrounding the throat 13. A number of relatively small radial holes 26, all of the same diameter and at the same axial location, in an annular arrangement, connect the annular chamber 25 in turn to the parallel bore 13 of the throat member 12.

The effect of the annular chamber 25 is to average the individual and often slightly varying pressures detected by each of the holes 26 and thus compensate in part for any distortions in the transverse velocity profile of the fluid entering the throat member 12 which may have been caused by disturbances in the flow conduits leading to the transducer.

A groove 27 containing an elastomeric O-ring contributes to the proper sealing of the annular chamber 25, as does the use of anaerobic sealant between screw-threads 28, 30—see below.

Connecting means 28 and 29 are provided at each end of the housing 10 in the form of internal screw threads by means of which the transducer can be incorporated into a hydraulic system (not shown).

As fluid flow through the flow passage from the upstream end 11a to the downstream end 11b increases, the piston 16 moves progressively in a downstream direction to present an increasing annular orifice 21 to fluid flow, at the same time compressing the spring 23. A vary differential pressure is thus induced across the annular orifice 21, acccording to the load rate of the spring 23 and the longitudinal profile of the valve member 19. This differential pressure is detected by tappings 24a and 24b, in the manner previously described herein, and is led away to a suitable measuring device.

For example, a suitable differential pressure transducer for this purpose is disclosed in European patent specification No. 0 119 038 and United States patent specification No. 4 523 476.

The shape of the valve member is, as shown in the drawings, conveniently frustro-conical which results in a relationship between flow and pressure differential which is roughly linear. This relationship is adequate where the transducer is used in conjunction with an analogue type readout device (such as a differential pressure dial gauge for instance) which can be calibrated to match. By varying the exact longitudinal profile of the valve member 19, different relationships can be brought about; one such variation would, for instance, result in a more precisely linear relationship such as would be necessary for use in conjuction with a digital readout device.

Fine adjustment of the initial loading of the piston biasing spring 23 during calibration is effected by appropriate axial positioning of the throat member 12, which has male screw threads formed on part 30 of its exterior for engagement with an extension of the internal connecting thread 28. After such adjustment the throat member is locked and sealed in position by, for instance, the use of an anaerobic locking sealant applied to the threaded part 30 of the throat member.

The downstream end of spring 23 bears upon the above-mentioned spring seating 31, which is itself retained by a circlip 32. By removal of this circlip at any time the working parts of the device may be withdrawn from the housing for cleaning and inspection; subsequent reassembly of the parts and replacement of the circlip restores the original calibration conditions within the transducer.

It has been determined by flow analysis that the maximum diameter of the valve member 19 can be reduced relative to that of the axial opening 18 by an amount which will permit the passage of full rated reverse flow whilst inducing a pressure drop of about 40 bar, without the proportional operating flow range of the transducer being reduced below about 30:1 which is quite acceptable for most industrial applications. In this way, inadvertent reverse flow can be accommodated in a simple manner without destructive effects to the interior parts of the device; it will be appreciated that system operating pressures in this type of application often rise as high as 420 bar or more, and, were not such provision made to accommodate reverse flow, the mechanism would be destroyed.

In a possible general modification, the screw threads 28 and 29 may be replaced by flanges (not shown) for purpose of connecting the transducer into a hydraulic system.

I claim:

1. A flow transducer for producing a pressure differential responsive to rate of fluid flow, comprising:
 a housing forming a fluid flow passage;
 a parallel throat disposed in said passage, said throat enlarging in the downstream direction into a first chamber;
 an annular chamber within said housing and surrounding said throat;
 a closely fitting yet freely sliding piston disposed within said first chamber and having an axial opening for the fluid flow;
 a substantially conical valve member located and supported in said first chamber for obturating the upstream end of said axial opening when there is no fluid flow, said valve member extending in the downstream direction nose first into said axial opening to provide a variable annular orifice for the fluid flow, the area of said orifice increasing progressively with increasing axial displacement of said sliding piston in the downstream direction;
 an axially extending coil spring for biasing said sliding piston in an upstream direction to tend to reduce the area of said variable annular orifice;
 two pressure tappings located in said housing at positions respectively upstream and downstream of said variable annular orifice for the detection of an induced pressure differential, said upstream pressure tapping communicating with said annular chamber surrounding said throat; and
 a plurality of radial holes in an annular arrangement, said radial holes opening from said annular chamber into said bore of said throat for the detection of the upstream component of the pressure differential, said radial holes being all of the same diameter and in the same axial position relative to said throat.

2. A flow transducer for producing a pressure differential responsive to rate of fluid flow, comprising:
 an elongate housing having a wall defining a first axial passage through said elongate housing;
 a throat member inserted in said first axial passage intermediate the ends of said first axial passage;
 conical valve means fixed at a downstream end of said throat member and tapering in the downstream direction;
 a closely fitting yet freely sliding piston slidably guided in said first axial passage downstream of said conical valve means, said piston defining a second axial passage for fluid flow, the upstream end of said piston cooperating with said conical valve means to provide a variable annular orifice for fluid flow, said piston having a range of axial displacement such that in its most upstream position it substantially obturates fluid flow past said conical valve means, said piston being slidingly displaceable from its most upstream position so as to progressively enlarge said variable annular orifice;

said throat member having an upstream end, a downstream end, and an opening at said upstream end spaced downstream from the upstream end of said elongate housing, said throat member having a wall defining an axial bore extending from said opening toward said downstream end of said throat member, said wall of said throat member having an aperture communicating with said axial bore and with said variable annular orifice for fluid flow;

an annular chamber formed between said wall of said throat member and said wall of said housing, said wall of said throat member having a plurality of angularly arranged radial holes, said radial holes opening from said annular chamber into said axial bore of said throat member, each of said radial holes having the same diameter, said radial holes being equally spaced around said axial bore, said radial holes being at the same axial position with respect to said throat member;

said housing including an upstream pressure tapping leading into said annular chamber;

said annular chamber being closed by said housing and said throat member except for said radial holes and said upstream pressure tapping;

an axially extending coil compression spring located within said first axial passage and engaging the downstream end of said piston;

a seat fixed in said housing and supporting a downstream end of said coil compression spring;

said coil compression spring being compressed between said piston and said seat to bias said piston toward its most upstream position;

said housing having a downstream pressure tapping leading into said first axial passage downstream from said downstream end of said piston over substantially the whole range of displacement of said piston;

whereby variable fluid flow produces variable displacement of said piston in said first axial passage and produces a variable pressure differential between said upstream and downstream pressure tappings.

3. A flow transducer as claimed in claim 2 wherein the housing is made in one piece.

4. A flow transducer as claimed in claim 2 wherein connecting means are provided at the upstream and downstream ends of the housing in the form of internal screw threads.

5. A flow transducer as claimed in claim 2, wherein the valve means is of simple frustro-conical form which has the effect of producing a roughly linear relationship between rate of fluid flow and pressure differential.

6. A flow transducer as claimed in claim 2, wherein said seat is generally annular and has an internal aperture of the same diameter as and coaxial with said second passage.

7. A flow transducer as claimed in claim 6, wherein said piston has an axial extension and said seat has an axial extension and wherein the ends of said spring are located between said wall of said housing and said extensions.

* * * * *